May 21, 1935.  A. J. DENISTON, JR  2,001,869
PROCESS OF MAKING LEAD HEADED SCREW THREADED NAILS
Filed July 27, 1934
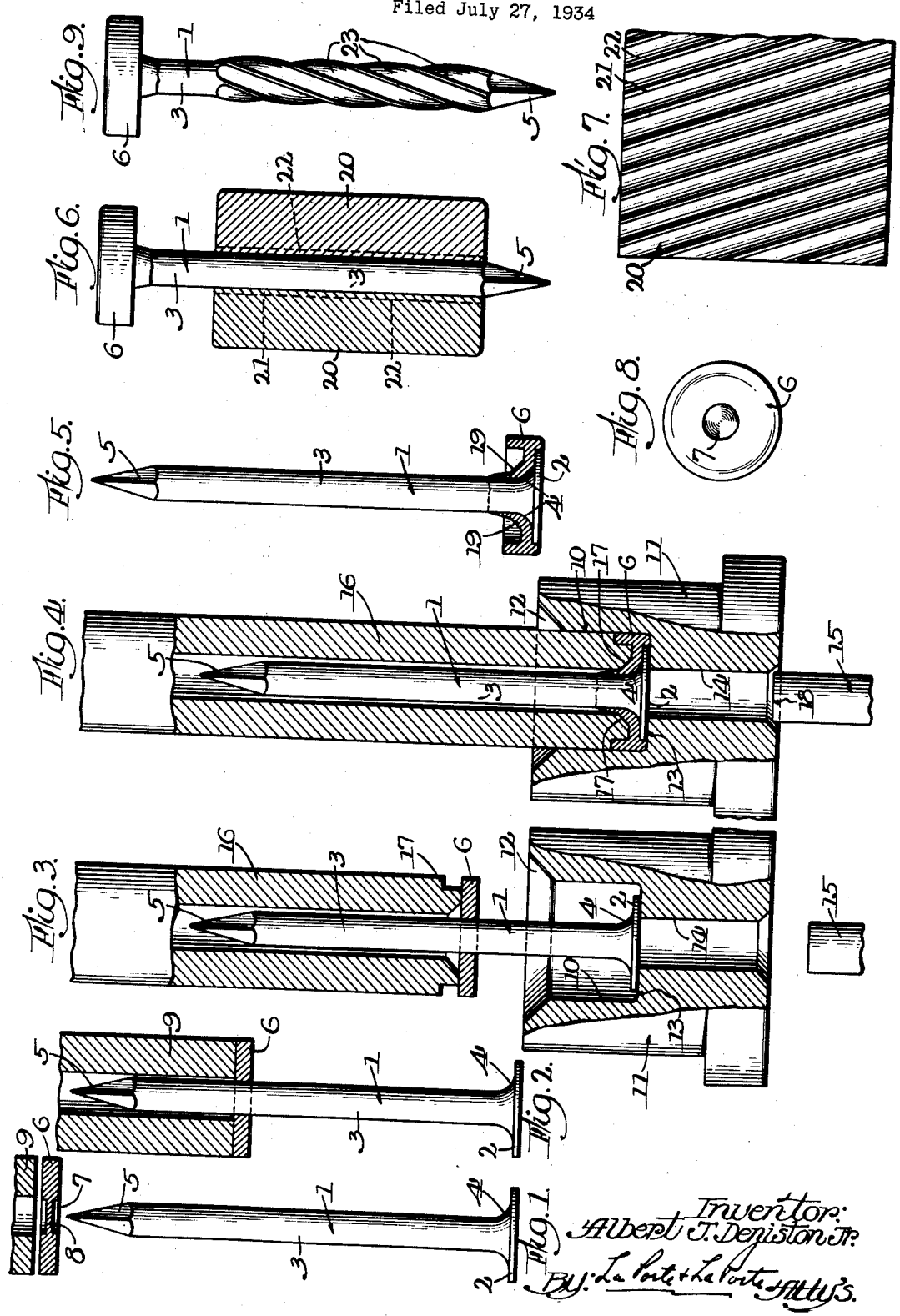

Patented May 21, 1935

2,001,869

UNITED STATES PATENT OFFICE 2,001,869

PROCESS OF MAKING LEAD-HEADED SCREW-THREADED NAILS

Albert J. Deniston, Jr., Chicago, Ill.

Application July 27, 1934, Serial No. 737,153

8 Claims. (Cl. 10—10)

This invention has reference to a process of making nails of the lead-headed screw-threaded shank type, typical of that disclosed in Letters Patent issued to me April 3, 1934, bearing No. 1,953,592 entitled " Combined fastening and sealing device ", said nails adapted for use in securing preferably sheet metal roofings to understructures.

The principal object of the present invention may be stated broadly to consist in a process of making nails of the lead-headed screw-threaded shank type including the steps of first permanently securing, either by die pressure or other methods, a sealing member formed of material softer than the nail, such as lead, in association with the head of a nail, and finally threading the shank of a nail to form a screw terminating in a point.

More specifically, the invention, as disclosed, may be stated to consist in the provision of a nail manufacturing process which includes the steps of first locating a lead sealing member in juxtaposition with the point of the shank of a nail, then forcing the sealing member upon the point of a nail to pierce said member and advancing the member upon the shank of a nail, then locating the head of a nail in a die member and advancing the sealing member on the shank of a nail to said head and permanently securing said member thereto, then removing the lead-headed nail from said die, then locating the shank of the lead-headed nail in screw-thread forming die members, and finally actuating the die members to form a screw on said shank of a nail terminating in a point.

That the invention may be more fully understood, reference is had to the accompanying drawing, forming a part of this application, illustrating in a more or less diagrammatic arrangement the various steps of my process, in which:

Fig. 1 is a diagrammatic view showing the initial step when applying the lead sealing member to a nail;

Fig. 2 illustrates the succeeding step which causes a nail to puncture and receive the lead sealing member on the shank of a nail;

Fig. 3 discloses the next step in the process consisting of placing the head of a nail in a die member, the sealing member on the shank thereof ready to be advanced to the nail head by means of a suitable forming punch;

Fig. 4 shows the completion of the steps in the forming and final application of the lead sealing member about the head of a nail;

Fig. 5 is a view of a completed lead-headed nail prior to the step of threading the shank thereof;

Fig. 6 is a diagrammatic view of a completed lead-headed nail in position for the succeeding and final step of the process for screw-threading the shank of a nail;

Fig. 7 is a diagrammatic view of an acting face of one of the thread rolling dies for threading the shank of a nail;

Fig. 8 is a plan view of a lead sealing member of the form illustrated in Fig. 1, and Fig. 9 is a view of a completed lead-headed screw-threaded shank nail.

Like characters of reference denote corresponding parts throughout the figures.

In carrying out my process for manufacturing lead-headed screw-threaded shank nails, it will be understood that wire nails of the ordinary well known form, having the usual flat head and plain shank are preferably utilized, however, nails having particular designed heads may be employed in carrying out the process herein described. Further, the nails above referred to are galvanized or provided with any well known coating of corrosion resistant material, such as zinc.

It will be understood from the following description that the shaping or rolling operation of screw threading the shanks of pregalvanized nails, results in the threaded surfaces thereof retaining a substantial protective coating of the galvanizing and incidental thereto, such surfaces are polished and rendered bright and smooth to facilitate the driving of the threads of the nails into position, or in other words, the incidental brightening, and polishing and smoothing of the galvanized surfaces of the threaded portion resulting from rolling the threads on the shanks, acts as a lubricant so to speak, and facilitates the rotational driving of the threads of the nails into position, as well as reducing liability of splitting the wood.

The instant disclosure illustrates the preferred type and form of lead sealing member and the specific steps and means for applying and forming the same about the head of a nail, i. e. a lead seal-member of disc-like formation. However, in the carrying out of my process for manufacturing lead-headed screw-threaded shank nails comprising the steps of first securing a lead sealing member about the head of a nail and finally threading the shank to form a screw terminating in a point, it will be understood, that other types of lead sealing members may be used without departing from the spirit and scope of my invention. Such other types of lead sealing members include the buck-shot or pellet type; the washer type; the punched type from lead strips, and the molten cast type.

Referring to the drawing, particularly to Fig. 1, wherein the initial step of my process is illustrated, 1 designates a wire nail, pregalvanized, having a preferably flat head 2 joined to the preferably plain shank 3 by means of a fillet 4 which, merging into the shank, constitutes the neck of a nail. The shank 3 thereof terminates in a point 5. As previously stated, I prefer to use as a lead sealing member for securement to the head 2 of a nail 1, a lead disc 6, the diameter and thickness of which is preferably larger than the diameter and thickness of the head 2 of a nail. Centrally of the disc 6 and on opposite faces thereof, is preferably provided axial depressed portions 7 which function to facilitate the puncturing of the relatively thin web 8 of the disc when it is suitably guided and located toward the point 5 of a nail 1 and caused to be driven upon said point by means of a suitably actuated hollow punch 9.

Fig. 2 discloses the resultant step in the process of the forward movement of the hollow punch 9 toward the head 2 of a nail 1, the web 8 of the lead disc 6 having been pierced by the point 5 and the disc received and advanced upon the shank 3 of a nail 1 to the extent of the forward movement of said punch 9, substantially as disclosed, whereupon said punch 9 is withdrawn from association with said shank 3 by suitable operating means to the position illustrated in Fig. 1 ready to repeat the operation just described, leaving the disc 6 reposed on the shank 3 between the point 5 and the head 2, as will be understood.

Fig. 3 discloses the succeeding step in the process comprising the locating of the head 2 of a nail 1, having the lead disc provided on the shank 3 thereof, by suitable moving and locating means into the pocket or seat 10 of a die member 11. The seat 10 is preferably of a diameter larger than the head 2 of a nail, whereby to permit the entrance and sliding fit reception of the disc 6 when caused to advance along the shank 3 towards and into the beveled opening 12 of said seat 10. Axially of said die member 11 and centrally disposed of said seat 10, and communicating with the bottom wall or surface 13 of said seat 10, is provided an opening 14 adapted for the reception and actuation of a reciprocating nail ejecting plunger 15.

Following or substantially simultaneously with the seating of the head 2 of a nail 1 within said seat 10, another suitably actuated forming punch 16 is caused to advance upon the shank 3, the die forming end 17 thereof abutting the previously located lead disc 6 on said shank 3, the continuing advancing movement of said forming punch 16 forcing the disc within said seat 10, guided thereinto by the beveled face 12, and permanently die formed about the head 2 of said nail 1.

Referring to Fig. 4, the completion of the steps in the forming and final application of the lead sealing member or disc 6 about the head 2 of a nail 1, by means of the forward pressure of the die forming end 17 of the forming punch 16 exerted upon said disc 6 about said head 2, is shown. Upon the completion of the lead-heading operation, the forming punch member 16 is withdrawn from association with said nail, whereupon the ejecting plunger 15 at the opposite end of said die 11 is suitably actuated, causing the head 18 thereof to enter the axial opening 14 and abut the upper exposed face of the head 2 of said nail and displacing the lead-headed nail from said die 11.

A completed lead-headed nail, comprehending the steps of the process illustrated in Figs. 1 to 4, both inclusive, is shown in Fig. 5.

Referring to Figs. 4 and 5, the secured lead sealing member or disc 6 about the head 2 is preferably desired to encircle the neck or fillet 4 and the underface of the head 2 and to extend partway down and encircle the shank 3 whereby to provide a lead fillet portion 19 of the sealing member or disc 6, the side walls of said formed sealing member or disc 6 preferably encircling the side walls of the head 2 and stopping flush with the top surface of said head, as shown, preferably leaving the driving face of the head 2 exposed for driving purposes.

The succeeding and final step of the process is diagrammatically shown in Figs. 6 and 7; Fig. 6 illustrating a completed lead-headed nail of the character shown in Fig. 5 in position with suitably operated coacting thread rolling die members 20, 20 for screw-threading the shank 3 of a nail 1. The thread forming face of one of said die members 20, 20 is illustrated in Fig. 7, comprising a plurality of diagonally extending thread forming die surfaces 21 and 22, the approximate depth of the surfaces 22 indicated in dotted lines in said members in Fig. 6.

In practice, it is preferred in the operation of said thread rolling die members 20, 20 that one of said members be stationary and the other movable, that is, the movable thread forming face of one die member be reciprocated back and forth by suitable actuating means across the thread forming face of the stationary die member, whereby when a completed lead-headed nail 1, as illustrated in Fig. 6, is positioned to be acted upon between the coacting die members 20, 20, the reciprocating movement of the movable die member will cause the shank 3 to be rotated between said members the length of said stationary die member, the movement of the shank 3 across the thread forming surfaces 21 and 22 of the die members 20, 20 forming the screw-threads 23 upon the shank 3 of a nail, as shown in finished and completed form in Fig. 9, presenting a lead-headed screw-threaded nail.

As shown in Fig. 6, it is noted that the coacting die members 20, 20 in their operation of rolling the screw-threads 23 upon the shank 3 do not contact the head 2, nor, the formed sealing member 6 thereof, such treated end of the nail being in free space and disposed away from the coacting die members, as shown, in order that the completed head will not be touched and thereby damaged in such operation.

The screw-threads 23, the result of the shaping or rolling step illustrated in Fig. 6, are shown in completed form in Fig. 9, being smooth and well defined screw-threads of high pitch adapted for imparting rotation to the nail when hammer-driven into position.

What I claim is:—

1. The process of manufacturing screw-threaded fasteners, which resides in taking a blank having a shank coated with corrosion resistant material and a pointed end and shaping screw-threads substantially throughout the length of said shank and terminating in said pointed end, said shaping thereof resulting in the surfaces of said threaded shank retaining a substantial protective covering of the corrosion resistant material and made bright and smooth to facilitate rotational driving of the threads of the fastener into holding position.

2. The process of manufacturing screw-threaded fasteners, which resides in taking a blank having a shank provided with a protective coating of zinc spelter and a pointed end and rolling screw-threads substantially throughout the length of said shank and terminating in said pointed end, said rolling thereof resulting in the surfaces of said threaded shank retaining a substantial protective coating of the zinc spelter and made bright and smooth to facilitate rotational driving of the threads of the fastener into holding position.

3. The process of manufacturing screw-threaded fasteners, which resides in taking a blank having a shank coated with corrosion resistant material and a pointed end and shaping driving-screw-threads of relatively high pitch substantially throughout the length of said shank and terminating in said pointed end, said shaping thereof resulting in the surfaces of said threaded shank retaining a substantial protective covering of the corrosion resistant material and made bright and smooth to facilitate rotational driving of the threads of the fastener into holding position.

4. The process of manufacturing screw-threaded fasteners, which resides in taking a blank having a shank provided with a protective coating of zinc spelter and a pointed end and rolling driving-screw-threads of relatively high pitch substantially throughout the length of said shank and terminating in said pointed end, said rolling thereof resulting in the surfaces of said threaded shank retaining a substantial protective coating of the zinc spelter and made bright and smooth to facilitate rotational driving of the threads of the fastener into holding position.

5. The process of manufacturing screw-threaded fasteners, which resides in taking a headed blank having a shank coated with corrosion resistant material and a pointed end and applying a sealing member of material softer than that of the body of the headed blank to the head thereof, and finally in shaping driving-screw-threads of relatively high pitch substantially throughout the length of the shank and terminating in said pointed end while the completed head is in free space, whereby said head is not bodily alteration by the action of the threading operation.

6. The process of manufacturing screw-threaded fasteners, which resides in taking a headed blank having a shank provided with a protective coating of zinc spelter and a pointed end and applying a sealing member of material softer than that of the body of the headed blank to the head thereof, and finally in rolling driving-screw-threads of relatively high pitch substantially throughout the length of the shank and terminating in said pointed end while the completed head is in free space, whereby said head is not subjected to bodily alteration by the action of the threading operation.

7. The process of manufacturing screw-threaded fasteners, which resides in taking a headed blank having a shank coated with corrosion resistant material and a pointed end and applying a sealing member of material softer than that of the body of the headed blank to the head thereof, and finally in shaping driving-screw-threads of relatively high pitch substantially throughout the length of the shank and terminating in said pointed end, said shaping thereof resulting in the surfaces of said threaded shank retaining a substantial protective covering of the corrosion resistant material and made bright and smooth to facilitate rotational driving of the threads of the fastener into holding position.

8. The process of manufacturing screw-threaded fasteners, which resides in taking a headed blank having a shank provided with a protective coating of zinc spelter and a pointed end and applying a sealing member of material softer than that of the body of the headed blank to the head thereof, and finally in rolling driving-screw-threads of relatively high pitch substantially throughout the length of the shank and terminating in said pointed end, said shaping thereof resulting in the surfaces of said threaded shank retaining a substantial protective coating of zinc spelter and made bright and smooth to facilitate rotational driving of the threads of the fastener into holding position.

ALBERT J. DENISTON, JR.